Patented Nov. 11, 1924.

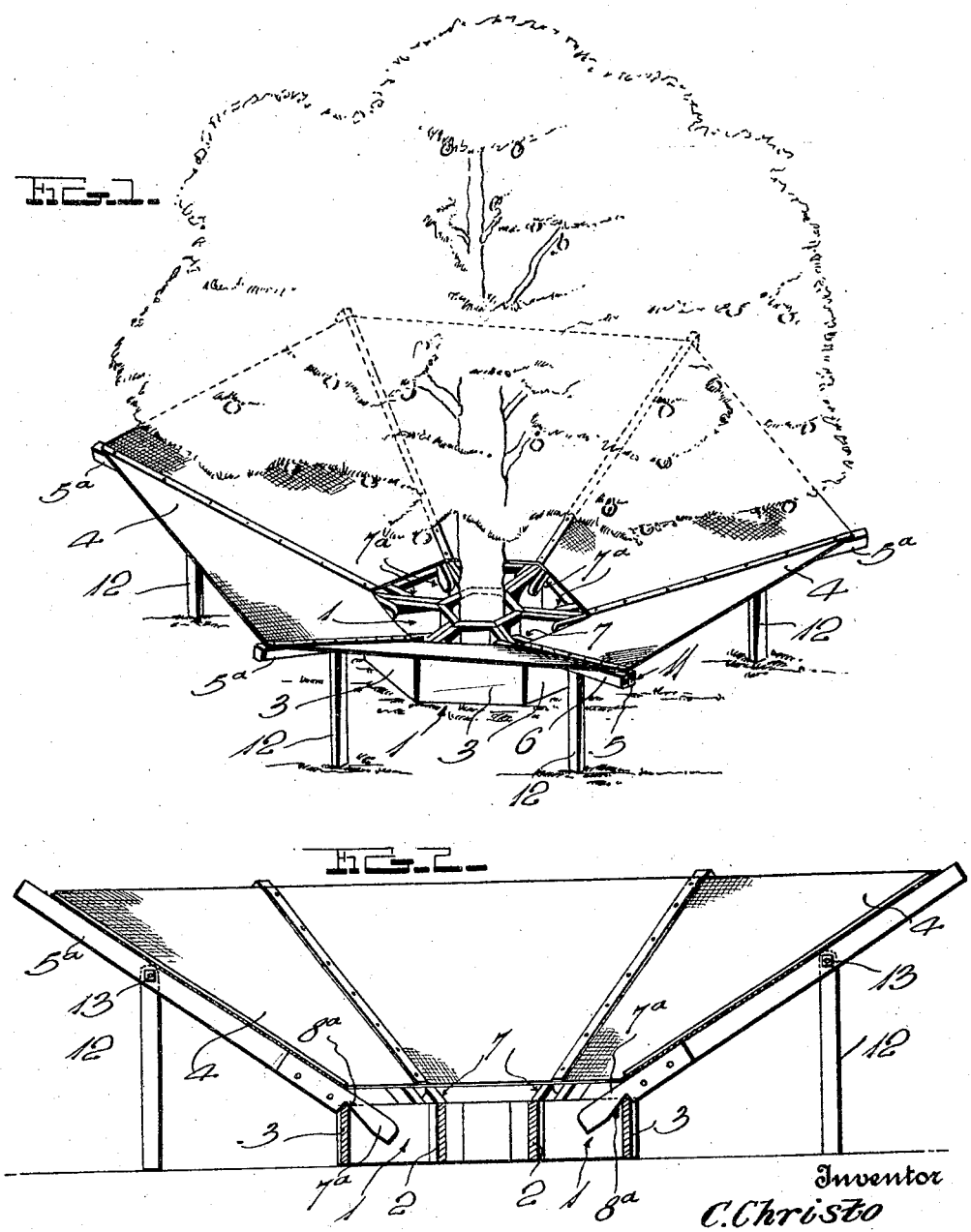

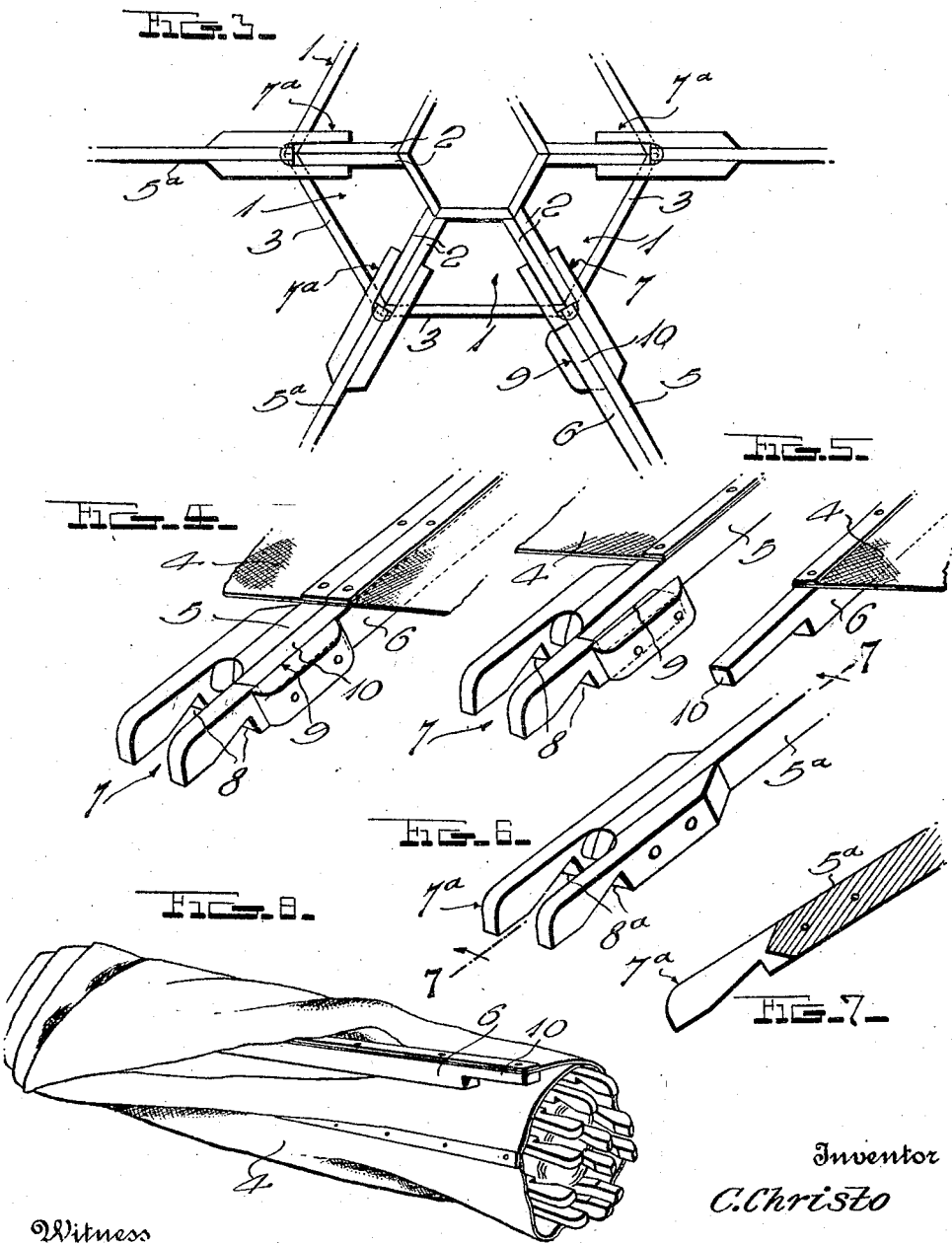

1,515,551

UNITED STATES PATENT OFFICE.

CANDIDO CHRISTO, OF HANFORD, CALIFORNIA.

FRUIT CATCHER.

Application filed May 8, 1924. Serial No. 711,873.

*To all whom it may concern:*

Be it known that I, CANDIDO CHRISTO, a citizen of Portugal, residing at Hanford, in the county of Kings and State of California, have invented certain new and useful Improvements in Fruit Catchers; and I do declare the following to be a full, clear, and exact description of the invention, such as will enable others skilled in the art to which it appertains to make and use the same.

My invention aims to provide a simple and inexpensive fruit catching device adapted to surround a tree to catch fruit either falling naturally therefrom, or caused to fall by shaking of the tree, the device being of such nature that it may be easily set up or taken down and may be compactly stored when its use is not needed.

With the foregoing in view, the invention resides in the novel subject matter hereinafter described and claimed, the description being supplemented by the accompanying drawings.

Figure 1 is a perspective view showing the application of the invention.

Figure 2 is a vertical sectional view.

Figure 3 is a partial plan view.

Figure 4 is a perspective view showing the manner in which the two ends of the receiving net are connected with each other.

Figure 5 is a disassembled perspective view of the parts shown in Fig. 4 to more fully disclose the manner in which the ends of the net may be disconnected.

Figure 6 is a perspective view of one of the forked supporting bars for the net.

Figure 7 is a sectional view on line 7—7 of Fig. 6.

Figure 8 is a perspective view showing the net and its supporting bars compactly rolled for storing.

In the drawings above briefly described, the preferred form of construction has been illustrated and while this construction has been herein rather specifically described, it is to be understood at the outset that within the scope of the invention as claimed, numerous modifications may be made.

The numerals 1 designate a plurality of segmental boxes or receptacles which are adapted to jointly surround a fruit tree, and for future reference, the abutting walls of said receptacles are identified by the numerals 2, while their outer walls are indicated at 3.

At 4, a catching net has been shown, which may well be formed of canvas or any other desired material, said net being of hexagonal form, radially split on a single line, as will be clear by reference to Figs. 4 and 5. The ends of the net, along the split, are secured to a pair of radial bars 5 and 6 respectively, which bars are adapted to contact with each other. The bar 5 is provided with a forked inner end 7 which extends across the outer walls of two of the receptacles 1, and straddles the abutting walls of said receptacles, as seen in Fig. 3. The furcations of the fork are preferably provided in their lower sides with notches 8 providing shoulders to contact with the outer sides of the walls 3, to hold the bar 5 against inward sliding. The inner end of this bar 5 is provided with a suitably constructed socket 9 which removably receives the reduced inner end 10 of the bar 6, and any desired means, such as the hook, indicated at 11 in Fig. 1, may be used for detachably connecting the outer ends of the bars 5 and 6.

Additional radially disposed bars 5ª are secured to the lower sides of the net 4 at suitable intervals and are provided with forked inner ends 7ª which pass over the outer walls of the receptacles 1 and straddle the abutting walls 2 thereof, as will be clear by reference to the several views. Like the fork 7, the forks 7ª have notches 8ª formed in their lower sides, providing shoulders to engage the outer sides of the receptacles and hold the bar 5ª against inward sliding.

All of the bars 5ª and either one of the bars 5 and 6, are preferably provided with supporting legs 12 which may well be pivoted at 13 thereto, so that they may be folded into parallel relation with the bars, when the device is to be stored. Then, the net 4 may be rolled around the numerous bars as shown in Fig. 8, so that said net and its carrying means will be exceptionally compact, for carrying from one place to another, or for storing.

The invention is simple and inexpensive, yet it is very desirable, particular attention being directed to the facts that the receptacles 1 form means for supporting the inner ends of the numerous radical bars, the forked inner ends of these bars hold the abutting ends of the receptacles in contact with each other, and said abutting ends constitute positioning means for the aforesaid bars, insuring that they shall all be located at the proper points.

As above suggested, while the preferred form of construction is illustrated, numerous changes may be made within the scope of the invention as claimed.

I claim:

1. A fruit catcher comprising fruit receptacles to jointly surround a tree, radial inclined bars having means at their inner ends for engaging the receptacles and holding the latter in assembled relation, and a net carried by said bars.

2. A fruit catcher comprising fruit receptacles to jointly surround a tree, said receptacles having abutting walls, and outer walls, a plurality of radial inclined bars passing over said outer walls and having forked ends straddling said abutting walls, means being provided for holding said bars against inward movement with respect to said receptacles, and a net carried by said bars.

3. A fruit catcher comprising fruit receptacles to jointly surround a tree, said receptacles having abutting walls, and outer walls, a plurality of radial inclined bars passing over said outer walls and having forked ends straddling said abutting walls, said bars also having shoulders abutting the outer sides of said outer walls, and a net carried by said bars.

4. A fruit catcher comprising an annular radially split net to surround a tree, radial bars secured to the ends of said net and contacting with each other one of said bars having a socket at its inner end removably receiving the inner end of the other bar, means detachably connecting the outer ends of said bars, additional radial bars for supporting the net, and supporting means for said bars.

In testimony whereof I have hereunto affixed my signature.

CANDIDO CHRISTO.